United States Patent [19]

Mori et al.

[11] Patent Number: 4,558,757
[45] Date of Patent: Dec. 17, 1985

[54] POSITION COORDINATE INPUT DEVICE

[75] Inventors: Yoshihiro Mori, Kadoma; Osamu Yamamoto, Hirakata; Kazumasa Yamamoto, Kawanishi, all of Japan

[73] Assignee: Matsushita Electric Industrial Co., Ltd., Kadoma, Japan

[21] Appl. No.: 615,534

[22] Filed: May 31, 1984

[30] Foreign Application Priority Data

Jun. 6, 1983 [JP] Japan .................. 58-101122

[51] Int. Cl.4 ............................................. G08C 21/00
[52] U.S. Cl. ........................................ 178/18; 177/211
[58] Field of Search .............................. 178/18, 19, 20; 364/557, 556, 508, 571; 73/862.63, 862.65, 862.67; 177/211, 226; 338/3

[56] References Cited

U.S. PATENT DOCUMENTS

| 3,657,475 | 4/1972 | Peronneau et al. | 178/18 |
| 3,727,002 | 4/1973 | Pear, Jr. | 178/18 |
| 4,121,049 | 10/1978 | Roeber | 178/18 |
| 4,389,711 | 6/1983 | Hotta et al. | 364/558 |
| 4,453,609 | 6/1984 | Griffen et al. | 73/862.65 |

FOREIGN PATENT DOCUMENTS 100136 of 1980 Japan .
10131 of 1983 Japan .
108545 of 1983 Japan .

Primary Examiner—Stafford D. Schreyer
Attorney, Agent, or Firm—Wenderoth, Lind & Ponack

[57] ABSTRACT

A position coordinate input device including an input plate subjected, at a point, to an external force with a finger, etc. so as to input data of coordinates of the point into a computer and the like. The device further includes four elastic support members for supporting the input plate, a pair of two first detectors yielding outputs of temperature characteristics of a first sign and a pair of two second detectors yielding outputs of temperature characteristics of a second sign opposite to the first sign so as to enable accurate detection of the coordinates of the point of application of the external force in a simplified construction.

12 Claims, 5 Drawing Figures

POSITION COORDINATE INPUT DEVICE

BACKGROUND OF THE INVENTION

The present invention generally relates to position coordinate input devices and more particularly, to a stress detection type position coordinate input device which determines, by detecting component forces of an applied external force with the use of a plurality of stress detectors, coordinates of a position indicated by a finger, a pointing rod, etc. and then, inputs the coordinates to a computer and the like.

Conventionally, as position coordinate input devices for use with computers, etc., there have been employed so-called digitizers which are expensive but are capable of accurately inputting coordinates of graphic forms. However, as computers have come into general use recently, there has been a demand for inexpensive position coordinate input devices. Especially, there is a strong demand for penetrating type position coordinate input devices by which data can be inputted so as to penetrate into their display units by depressing, with a finger, etc., graphic forms displayed on the display units. This is because such a method is generally adopted of late that, in order to enable even persons unfamiliar with operation of computers to operate them with ease, several selective branches prepared beforehand are displayed on the display units such that processing is automatically performed by depressing one of the selective branches with a finger, etc. Light pens have been typically used as such penetrating type position coordinate input devices. However, there have been to data proposed various devices adopting more convenient methods in which data can be inputted by a finger, a ball-point pen, etc. without using the light pens. As typical ones of such methods, there can be recited a switch matrix method employing a transparent and electrically conductive sheet, a voltage/electric current divisional method, a method employing laser beams, a method in which a time period required for transmission of surface waves is measured, etc.

However, these prior art devices have such inconveniences that the devices are complicated in structure and expensive, that it is hard to view data displayed on the display units, that it is difficult to perform maintenance operations therefor, etc., thus preventing the prior art devices from coming into popular use.

In place of the above described prior art devices, there has been further proposed a stress detection type position coordinate input device in which, by detecting component forces of a force applied to a point on an input plate, coordinates of the point of application of the force are detected. The stress detection type position coordinate input device can employ an input plate made of uniform and entirely transparent materials such as a glass plate, an acrylic plate, etc. and is simple in structure, thus lowering its production cost. A device based upon such a principle is disclosed, for example, in Japanese Patent Publication No. 34247/1974 (Tokkosho 49-34247) and U.S. Pat. No. 4,389,711 in which, by detecting component forces of a force at three points on the input plate, coordinates of the point of application of the force are detected as shown in FIG. 1.

In FIG. 1, when a force F is applied to a point 2 on a rectangular input plate 1 having a longitudinal length H and a sidewise length 2L, component forces f1, f2 and f3 of the force F are measured at points 3a, 3b and 3c, respectively. It is to be noted that the point 3c is located at an uppermost central point of the input plate 1. Thus, when Cartesian coordinates X and Y are established by setting the point 3a at the origin as shown, the points 3a, 3b and 3c assume coordinates (0,0), (2L,0) and (L,H), respectively. Consequently, coordinates (x,y) of the point 2 of application of the force F are given by the following equations.

$$x = \frac{f3 + 2f2}{F} \cdot L \quad (1)$$

$$y = \frac{f3}{F} \cdot H \quad (2)$$

where:
$$F = f1 + f2 + f3 \quad (3)$$

Accordingly, it has become apparent that the coordinates (x,y) of the point 2 of application of the force F can be determined by detecting the component forces at three points. However, this known device has a disadvantage that such factors as weight of the input plate 1, variations of detection outputs of the component forces in response to temperature changes, errors due to strain of the input plate 1 itself, etc. are required to be taken into account in regard to determination of the point 2 of application of the force F. Furthermore, the known device has been disadvantageous in that, since strain of the input plate 1 increases upon application of the force F to such an end portion of the input plate 1 as a point 4 (FIG. 1) in the case where the input plate 1 has a rectangular shape, the input plate 1 is required to be increased in strength as the input plate 1 becomes large in size.

SUMMARY OF THE INVENTION

Accordingly, an essential object of the present invention is to provide an improved position coordinate input device which is capable of inputting, with high accuracy, to other apparatuses coordinate data of a position on an input plate indicated by a finger, etc., with substantial elimination of the disadvantages inherent in conventional devices of this kind.

Another important object of the present invention is to provide an improved position coordinate device of the above described type which is simple in structure, highly reliable in actual use and suitable for mass production at low cost.

In accomplishing these and other objects according to one preferred embodiment of the present invention, there is provided an improved position coordinate input device comprising: an input plate; four elastic plates which are provided at four positions of said input plate, respectively; and four stress detectors for detecting component forces of an external force applied to a point on said input plate, respectively, which are provided on said elastic plates, respectively, whereby coordinates of said point of application of the external force are detected and data of said coordinates are transmitted to other apparatuses.

It should be noted that it is necessary to minimize strain of the input plate and errors due to temperature changes in order to obtain highly accurate coordinate data. In accordance with the present invention, since the input plate is supported at its four points more stably than the known devices having the input plate supported at its three points, it becomes possible to reduce errors due to strain of the input plate.

Furthermore, in accordance with the present invention, since the four stress detectors are composed of a pair of two first stress detectors and a pair of two second stress detectors such that the first stress detectors and the second stress detectors yield first outputs having temperature characteristics of a first sign and second outputs having temperature characteristics of a second sign opposite to the first sign, respectively so as to cancel each other variations produced in the first and second outputs due to temperature changes, errors due to the temperature changes can be eliminated. Such a technique cannot be employed in the known arrangements having the input plate supported at the three points but can be employed only in the arrangement having the input plate supported at the four points according to the present invention.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

Before the description of the present invention proceeds, it is to be noted that like parts are designated by like reference numerals throughout several views of the accompanying drawings.

DETAILED DESCRIPTION OF THE INVENTION

Figure 1:
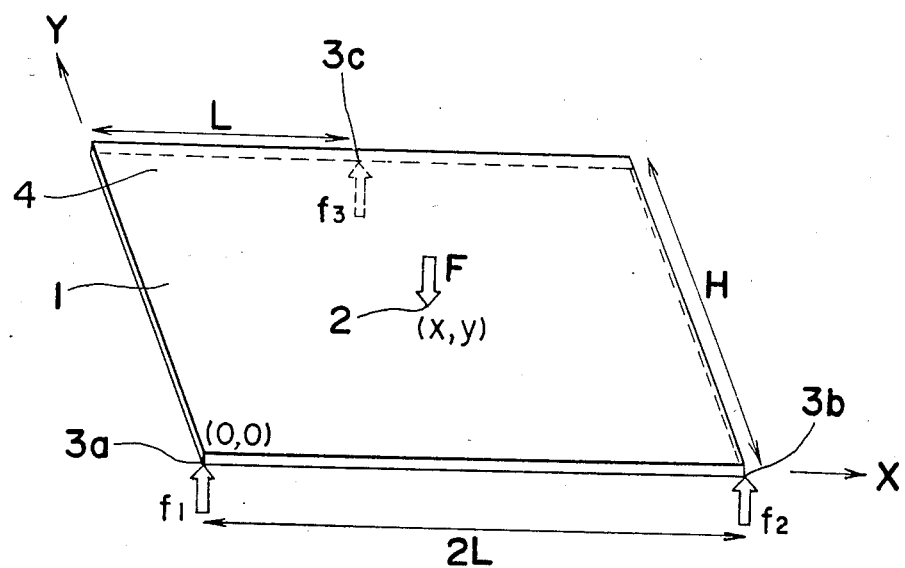
FIG. 1 is a view showing a principle of a prior art stress detection type position coordinate input device (already referred to)
Figure 2:
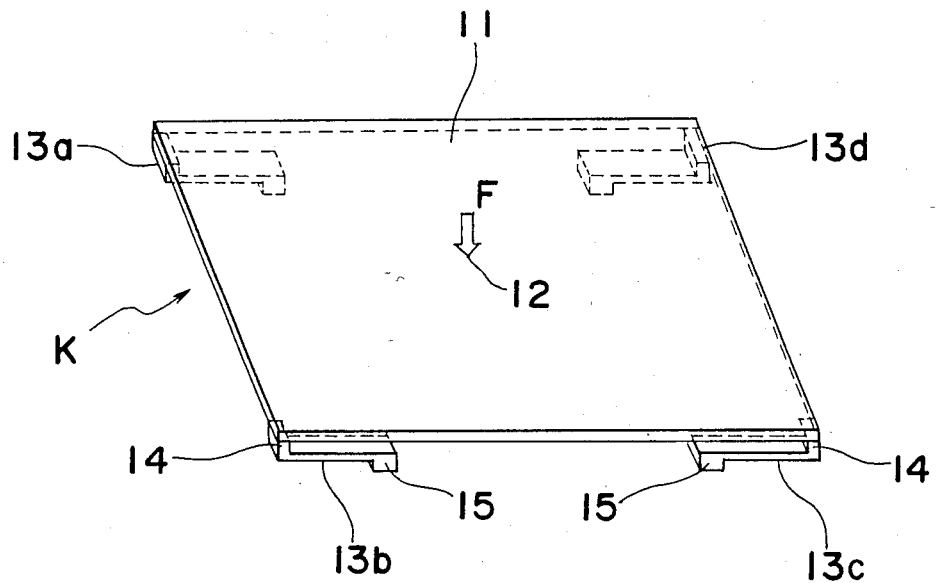
FIG. 2 is a perspective view of a position coordinate input device according to one preferred embodiment of the present invention.

Referring now to the drawings, there is shown in FIGS. 2 to 5, a position coordinate input device K according to one preferred embodiment of the present invention. The input device K generally includes a rectangular input plate 11 subjected to an external force F at a point 12 and four elastic plates 13, i.e., 13a, 13b, 13c and 13d. The input plate 11 is made of plate glass having a longitudinal length of 188 mm, a sidewise length of 252 mm and a thickness of 3 mm, while each of the elastic plates 13a to 13d made of stainless steel has an effective length of 50 mm, a width of 10 mm and a thickness of 2 mm. Each of the elastic plates 13a to 13d has a first projection 14 formed at one end thereof and a second projection 15 formed at the other end thereof and protruding in a direction opposite to that of the first projection 14 such that the first projection 14 and the second projection 15 are, respectively, secured to each of four corners of the input plate 11 and a fixed frame (not shown).

Figure 3:
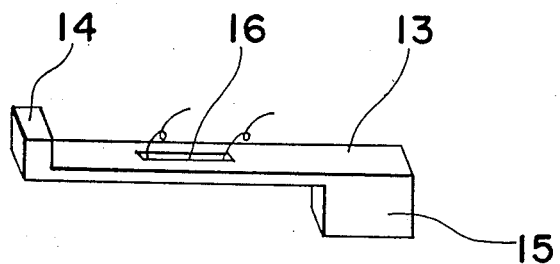
FIG. 3 is an enlarged perspective view of an elastic plate employed in the position coordinate input device of FIG. 2.

As shown in FIG. 3, each of the elastic plates 13a to 13d has a flat portion extending between the first projection 14 and the second projection 15. A semiconducting strain gauge 16 acting as a strain detector is attached to one face of the flat portion of each of the elastic plates 13a to 13d so as to be located approximately at a central portion both in the width and in the effective length of each of the elastic plates 13a to 13d.

Figure 4:
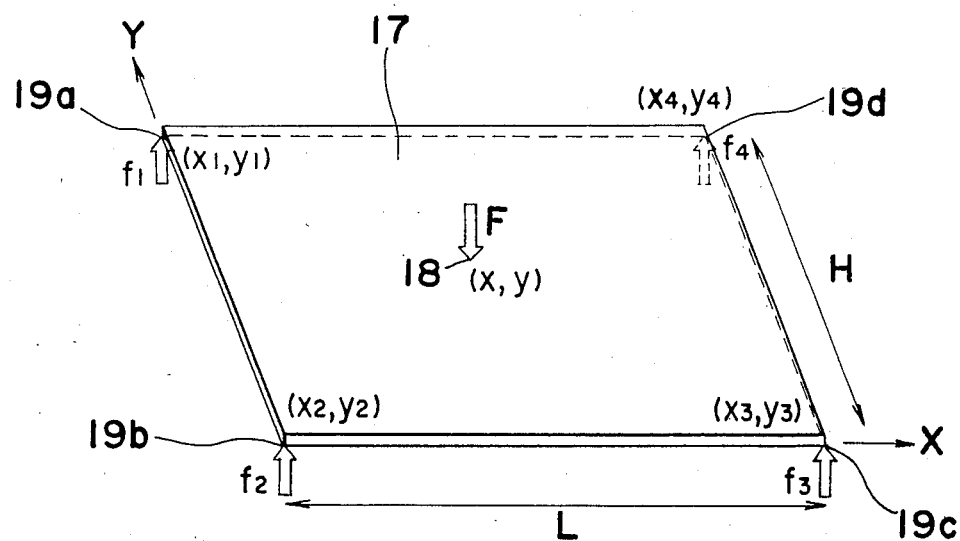
FIG. 4 is a view showing a principle of the position coordinate input device of FIG. 2.

Hereinbelow, a principle of detection of the coordinates of the point of application of the external force, upon which the input device K is based, will be described with reference to FIG. 4. In FIG. 4, an external force F is applied to a point 18 on an input plate 17 and component forces f1, f2, f3 and f4 of the external force F are, respectively, detected at points 19a, 19b, 19c and 19d which are located at four corners of the input plate 17, respectively.

Let (x1,y1), (x2,y2), (x3,y3) and (x4,y4) denote coordinates of the points 19a, 19b, 19c and 19d, respectively, coordinates (x,y) of the point 18 of application of the external force F can be expressed from equilibrium of moments in the plane of the input plate 17 by the following equations:

$$x = \frac{f1 x1 + f2 x2 + f3 x3 + f4 x4}{F} \qquad (4)$$

$$Y = \frac{f1 y1 + f2 y2 + f3 y3 + f4 y4}{F} \qquad (5)$$

where:
$$F = f1 + f2 + f3 + f4 \qquad (6)$$

It is to be noted here that the input plate 17 is of a rectangle having a longitudinal length H and a sidewise length L and that the points 19a, 19b, 19c and 19d are, respectively, located at four vertexes of the rectangle. When Cartesian coordinates X and Y are established by setting the point 19b at the origin as shown, the coordinates (x1,y1), (x2,y2), (x3,y3) and (x4,y4) assume the following values:

x1=0, y1=H;
x2=0, y2=0;
x3=L, y3=0;
x4=L, y4=H.

Thus, the coordinates (x,y) of the point 18 are given by the following equations:

$$x = (f3 + f4) \cdot L/F \qquad (7)$$

$$y = (f1 + f4) \cdot H/F \qquad (8)$$

Consequently, it is possible to determine the coordinates of the point of application of the external force by measuring the component forces at the four points.

In the input device K, it is so arranged that the component forces f1 to f4 are obtained by converting resistance changes of the semiconducting strain gauges 16 into voltage changes.

Figure 5:
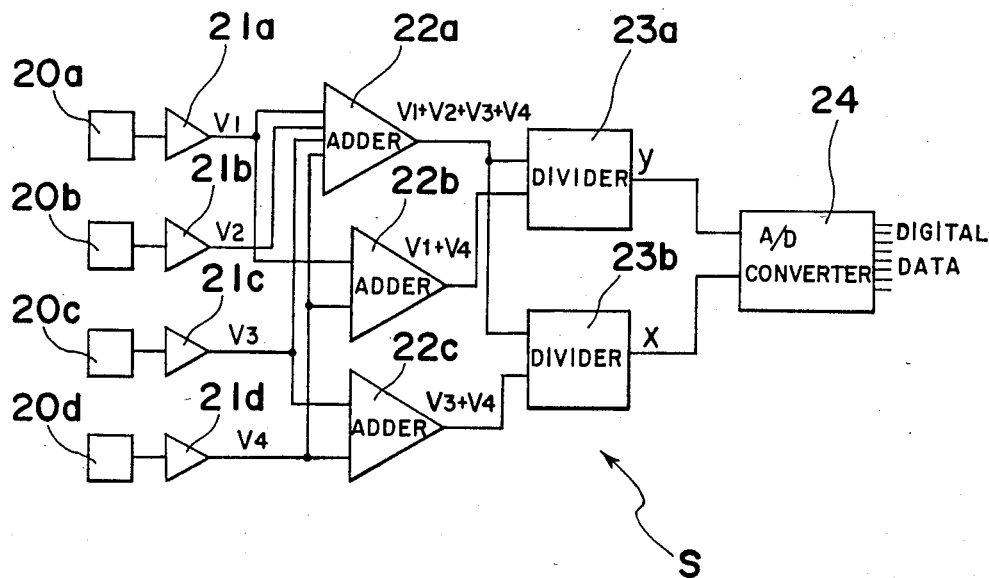
FIG. 5 is a block diagram of an electrical circuit employed in the position coordinate input device of FIG. 2.

Referring to FIG. 5, there is shown an electrical circuit S employed in the input device K. The electrical circuit S includes strain detectors 20a, 20b, 20c and 20d formed by the semiconducting strain gauges 16 of the elastic plates 13a, 13b, 13c and 13d, respectively, conversion circuits 21a, 21b, 21c and 21d for converting resistance changes of the strain detectors 20a, 20b, 20c and 20d into voltage changes, respectively, adders 22a, 22b and 20c, dividers 23a and 23b and an analog-to-digital converter 24. By this arrangement of the electrical circuit S, analog outputs according to the equations (7) and (8) can be obtained so as to be inputted, as digital data, from the analog-to-digital converter 24 to a computer, etc.

Meanwhile, Japanese Patent Publication No. 34247/1974 (Tokkosho 49-34247) mentioned earlier discloses that it is impossible to obtain coordinates of a point of application of an external force by measuring component forces at four or more points on an input plate. However, in the input device K of the present invention, the elastic plates 13a to 13d for detecting the component forces are so arranged as shown in FIG. 3 such that the component forces detected at the four points are directed in the same direction, whereby it becomes possible to detect the component forces at the four points on the input plate. Namely, in the input device K, it is so arranged that its detection sensitivity is improved by using the elastic plates 13a to 13d in a direction perpendicular to the faces thereof each having the semiconducting strain gauge 16 attached thereto. Furthermore, in the input device K, the semiconducting strain gauges 16 are of such high sensitivity as to detect the component forces even upon displacement of 1 mm or less of a distal end of each of the elastic plates 13a to 13d, whereby such a phenomenon hardly takes place that the semiconducting strain gauges 16 are displaced in the direction of the component forces by bending the elastic plates 13a to 13d. Furthermore, in the input device K, since the input plate 11 is more stably supported at its four corners than the known input plates supported at the three points, strain of the input plate 11 is reduced, so that errors due to strain of the input plate 11 is also reduced.

Meanwhile, an output voltage v of each of the conversion circuits 21a to 21d responsive to an applied force f includes a component a variable due to temperature changes and a component proportional to the force f and therefore, is generally given by:

$$v = a + kf \tag{9}$$

where:
k = constant.

In the input device K, in order to decrease errors due to the temperature changes, it is so arranged that the components a of the output voltages of the conversion circuits 21a to 21d cancel each other. Namely, a pair of two first stress detectors and a pair of two second stress detectors are employed as the stress detectors 20a to 20d such that the component a of the output of each of the first stress detectors is equal, in absolute value, to but different, in sign, from that of the output of each of the second stress detectors. More specifically, in the input device K, output voltages v1, v2, v3 and v4 of the conversion circuits 21a to 21d are expressed by the following equations:

$$v1 = a + kf1 \tag{10}$$

$$v2 = -a + kf2 \tag{11}$$

$$v3 = a + kf3 \tag{12}$$

$$v4 = -a + kf4 \tag{13}$$

From the equations (7) and (8), the coordinates (x,y) are given by:

$$x = (v3 + v4) \cdot L/(v1 + v2 + v3 + v4) \tag{14}$$

$$y = (v1 + v4) \cdot H/(v1 + v2 + v3 + v4) \tag{15}$$

Thus, the components a variable due to the temperature changes have been eliminated from the equations (14) and (15), which is possible only in the arrangement of the present invention having the input plate supported at its four points. To this end, in the input device K, the semiconducting strain gauges 16 of an identical temperature coefficient are employed. Furthermore, two of the semiconducting strain gauges 16 are attached to upper faces of the elastic plates 13a and 13d, respectively, while the remaining two of the semiconducting strain gauges 16 are attached to lower faces of the elastic plates 13b and 13c, respectively such that resistance changes of the semiconducting strain gauges 16 attached to the elastic plates 13a and 13d take place in response to the strains oppositely to those of the semiconducting strain gauges 16 attached to the elastic plates 13b and 13c. In order to eliminate the errors due to the temperature changes, it has been conventionally so arranged that two semiconducting strain gauges are required to be provided at one measuring point of each component force so as to be actuated differentially. However, by the above described arrangement of the input device K, only one semiconducting strain gauge is required to be provided at one measuring point of each component force and thus, the errors due to the temperature changes can be reduced by employing only four semiconducting strain gauges as a whole.

In order to reduce the errors due to the temperature changes, it can be also so arranged that semiconducting strain gauges of opposite temperature-dependent properties are employed.

In accordance with the present invention, it was found that an accuracy of ±5 mm can be obtained for external forces ranging from 200 to 500 g and is sufficiently high for the position coordinate input device manipulated by a finger.

Although the outputs of the strain detectors are converted into the coordinate data by the analog circuit in the above described embodiment, the analog circuit can be replaced by a digital circuit or software. Furthermore, it is also possible to employ an opaque aluminum plate etc. as the input plate.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed is:

1. A position coordinate input device comprising:
   an input plate;
   four elastic support members for supporting said input plate;
   four detector means for detecting that an external force has been applied to a point on said input plate, which are, respectively, provided on said elastic support members and are constituted by a pair of two first detector means yielding outputs having temperature characteristics of a first sign and a pair of two second detector means yielding outputs having temperature characteristics of a second sign opposite to the first sign; and
   a circuitry for outputting, in response to said outputs from said four detector means, data of coordinates of said point, which data are corresponding to said outputs.

2. A position coordinate input device as claimed in claim 1, wherein said input plate is made of transparent material.

3. A position coordinate input device as claimed in claim 1, wherein said four elastic support members are, respectively, disposed at four corner portions of said input plate.

4. A position coordinate input device as claimed in claim 1, wherein each of said elastic support members has a shape of a flat plate and is formed, at one end thereof, with a first projection for supporting said input plate and is formed, at the other end thereof, with a second projection secured to a fixed member.

5. A position coordinate input device as claimed in claim 4, wherein each of said detector means is formed by a strain detector and is provided on a flat portion of each of said elastic support members, with said flat portion extending between said first projection and said second projection.

6. A position coordinate input device as claimed in claim 1, wherein each of said detector means is formed by a semiconducting strain gauge.

7. A position coordinate input device comprising:
an input plate;
four elastic support members for supporting said input plate, each of which has a shape of a flat plate and is formed, at one end thereof, with a first projection for supporting said input plate and is formed, at the other end thereof, with a second projection secured to a fixed member so as to be formed with a flat portion extending between said first projection and said second projection;
four detector means for detecting that an external force has been applied to a point on said input plate, two of which are each provided on an upper face of the flat portion of each of two of said four elastic support members and the remaining two of which are each provided on a lower face of the flat portion of each of the remaining two of said four elastic support members; and
a circuitry for outputting, in response to outputs from said four detector means, data of coordinates of said point, which data are corresponding to said outputs.

8. A position coordinate input device as claimed in claim 7, wherein said input plate is made of transparent material.

9. A position coordinate input device as claimed in claim 7, wherein said four elastic support members are, respectively, disposed at four corner portions of said input plate.

10. A position coordinate input device as claimed in claim 7, wherein each of said detector means is formed by a semiconducting strain gauge.

11. A position coordinate input device as claimed in claim 7, wherein each of said elastic support members is partially or wholly formed by an elastic plate made of stainless steel.

12. A position coordinate input device comprising:
an input plate made of transparent material;
four elastic support members for supporting four corner portions of said input plate, each of which has a shape of a flat plate and is formed, at one end thereof, with a first projection for supporting said input plate and is formed, at the other end thereof, with a second projection secured to a fixed member so as to be formed with a flat portion extending between said first projection and said second projection;
four strain detectors for detecting that an external force has been applied to a point on said input plate, each of which is formed by a semiconducting strain gauge;
two of said four strain detectors being each provided on an upper face of the flat portion of each of two of said four elastic support members, while the remaining two of said four strain detectors are each provided on a lower face of the flat portion of each of the remaining two of said four elastic support members; and
a circuitry for outputting, in response to outputs from said four strain detectors, data of coordinates of said point, which data are corresponding to said outputs.

* * * * *